(12) United States Patent
Schindlbeck et al.

(10) Patent No.: US 7,459,691 B2
(45) Date of Patent: Dec. 2, 2008

(54) CASSETTE FOR A STORAGE FLUORESCENT SCREEN

(75) Inventors: Günther Schindlbeck, München (DE); Werner Stahl, Heimstetten (DE); Olaf Klabunde, Giengen /Brenz (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 826 days.

(21) Appl. No.: 10/973,892

(22) Filed: Oct. 26, 2004

(65) Prior Publication Data

US 2005/0104011 A1    May 19, 2005

(30) Foreign Application Priority Data

Nov. 14, 2003  (EP)  .................................. 03104202

(51) Int. Cl.
*G03B 42/04*  (2006.01)
(52) U.S. Cl. .................................................. 250/385.1
(58) Field of Classification Search ............... 250/485.1
See application file for complete search history.

(56) References Cited

U.S. PATENT DOCUMENTS

| | | | |
|---|---|---|---|
| 3,916,206 A | 10/1975 | Koch et al. | |
| 4,889,989 A | 12/1989 | Yoshimura et al. | |
| 5,265,865 A | 11/1993 | Agano et al. | |
| 5,475,230 A * | 12/1995 | Stumpf et al. | ............ 250/484.4 |
| 2002/0121612 A1 * | 9/2002 | Foos et al. | ............... 250/484.4 |

FOREIGN PATENT DOCUMENTS

| | | |
|---|---|---|
| DE | 3322917 C2 | 1/1985 |
| EP | 1 324 117 A1 | 7/2003 |
| EP | 03 10 4202 | 3/2004 |

* cited by examiner

*Primary Examiner*—David P Porta
*Assistant Examiner*—Marcus H Taningco
(74) *Attorney, Agent, or Firm*—Houston Eliseeva, LLP

(57) ABSTRACT

The invention relates to a cassette, in particular an X-ray cassette, for receiving a storage fluorescent screen. The cassette has on one of its narrow sides an opening through which the storage fluorescent screen is to be inserted into or removed from the cassette. The opening is closable by a flap which is displaceable between a closed position in which it closes the opening and a release position in which it releases the opening for insertion or removal of the storage fluorescent screen. For this purpose the flap is mounted swivellably to the transition between the narrow side of the cassette provided with the opening and the base of the cassette or the cassette lid.

20 Claims, 4 Drawing Sheets

CASSETTE FOR A STORAGE FLUORESCENT SCREEN

FIELD OF THE INVENTION

The invention relates to a cassette, in particular an X-ray cassette, for receiving a storage fluorescent screen.

BACKGROUND OF THE INVENTION

A cassette of the above-mentioned type is used, in particular, for imaging with X-rays, for example, for medical purposes. The cassette serves to receive a storage fluorescent screen in which an image generated with X-ray radiation can be stored latently. The storage fluorescent screen is kept in the cassette during transportation and normally is removed from the cassette only for reading out the stored image.

Known from EP 1 324 117 A1 is a cassette for receiving such a storage fluorescent screen which is provided with an opening through which the storage fluorescent screen can be inserted in the cassette or removed therefrom. To protect the storage fluorescent screen contained in the cassette against unintentional exposure and from contamination and damage, the known cassette is provided at its opening with a closure which is displaceable between a closed position in which it closes the opening and a release position in which it releases the opening for insertion or removal of the storage fluorescent screen. In this case a cover strip extending the length of the opening and provided at each end with a bearing plate, which in turn is pivoted in the cassette, is used as the closure. To operate the closure an operating mechanism which can be displaced inside the cassette from outside by the actuating element is contained in the cassette.

The disadvantage of this known cassette is that the opening is of comparatively small dimensions because of the nature of the pivoted closure mounting, whereby insertion of the storage fluorescent screen in the cassette and removal of same from the cassette are made difficult.

U.S. Pat. No. 5,441,251 discloses a cassette for receiving a storage fluorescent screen. In this case the base of the cassette is divided into two sections, one of the sections being attached swivellably to the other section and being swivellable up to open the cassette so that the storage fluorescent screen can be inserted in the cassette or removed therefrom.

A major disadvantage of this known cassette is that the base section to be opened requires a large swivelling area in order to remove the storage fluorescent screen from, or insert the storage fluorescent screen into, the cassette. Because a cassette is normally opened only inside a device, for example, a readout device, a correspondingly large swivelling area is required in the device so that the cassette can be opened.

SUMMARY OF THE INVENTION

It is an object of the invention to develop further a cassette of the above-mentioned type in such a way that the opening for insertion and removal of the storage fluorescent screen is as large as possible and at the same time the space requirement for the closure of the cassette is as small as possible.

In the cassette according to the invention a flap which can close or open an opening formed in a narrow side of the cassette serves as the closure, the flap being mounted swivellably at the transition between the narrow side of the cassette provided with the opening and the base or lid of the cassette. The swivellable mounting of the flap in the region of the transition between the narrow side of the cassette and the base or lid of the cassette has the advantage that a significantly smaller swivelling area must be reserved for the flap than with the cassettes known from the prior art. At the same time the flap can extend over the full height of the narrow side of the cassette, so that a maximum size for the opening of the cassette can be achieved. This simplifies, in particular, removal of the storage fluorescent screen from the cassette and insertion of the storage fluorescent screen into the cassette. In addition, there is the advantage that if the flap is swivelled open further than 90° the open flap provides additional mechanical stabilization of the base or lid of the cassette.

Further advantages and embodiments of the invention will be apparent from the following description, the drawings and the dependent claims.

In another embodiment of the cassette according to the invention it is proposed that the flap has an L-shaped cross-section, viewed in the direction transverse to the swivel axis of the flap. Through the L-shaped cross-section mechanical stabilization of the cassette is achieved both with the flap closed and with the flap open, preventing crushing or gaping of the cassette.

The L-shaped flap is mounted swivellably by one flange to the base of the cassette while its other flange is inserted below the cassette lid into the interior of the cassette in the closed position of the flap. By this measure especially good light sealing in the region of the opening is achieved with the flap closed. Furthermore, with the flap closed the cassette lid is additionally supported by the flange of the flap projecting into the cassette, preventing crushing of the cassette in the region of the opening.

The flap is mounted swivellably by means of a hinge to the base of the cassette, especially preferably to the base which faces towards the X-rays while an X-ray image is being taken, the so-called tube side.

For swivellable mounting of the flap to the cassette the use of a film hinge is proposed, since a film hinge can be manufactured simply and at low cost while also being robust and ensuring a high degree of light sealing in the region of the hinge.

To prevent unintentional opening of the cassette, for example, during transportation, a locking device which can be actuated from outside is provided on the cassette, which device locks the flap in its closed position and releases the flap for opening when actuated from outside.

In a further development of this embodiment, the locking device serves at the same time to fix the storage fluorescent screen in the cassette, so that the storage fluorescent screen, for example, when being removed from the cassette, is retained in a defined position in the cassette. Automated removal using a handling device, for example, is simplified thereby.

In this further development it is advantageous if the locking device is movable between a locking position in which it locks the flap in its closed position, an intermediate position in which it has released the flap for opening and is in engagement with at least one retaining element provided on the storage fluorescent screen for fixing the storage fluorescent screen, and an unlocking position in which it definitively releases the storage fluorescent screen. It is achieved by this predetermined sequence that the storage fluorescent screen is held in a defined manner in the cassette when the flap is opened, so that the handling device referred to previously can move into engagement with the storage fluorescent screen held in a defined position. As soon as the handling device has gripped the storage fluorescent screen the locking device can be moved to its unlocking position in which it releases the storage fluorescent screen. An actuating element, such as a movable pin, which is operated by the device into which the cassette is inserted, is used, for example, to actuate the locking device.

The above-described mechanism for locking and unlocking the flap and the storage fluorescent screen can be implemented especially simply if only two possible positions for the locking device are provided. In this embodiment the first position corresponds to the above-described locking position in which the closed flap is locked. The second position corresponds to the above-described intermediate position in which the flap has been released for opening while the storage fluorescent screen is still fixed. If the locking device is now moved back to its first position with the flap open it finally releases the storage fluorescent screen. In this embodiment, therefore, the first position also corresponds to the above-described unlocking position. The locking and unlocking of the flap and the storage fluorescent screen are therefore achieved in this embodiment simply by pressing and then releasing the locking device.

Used as the locking element is a locking slider mounted displaceably parallel to the longitudinal direction of the opening and having at least one first locking aperture for engaging with a locking element provided on the inner face of the flap oriented towards the interior of the cassette, and at least one second locking aperture for engaging with a retaining element projecting from the storage fluorescent screen. In this way both the locking and unlocking of the flap and the simultaneous fixing of the storage fluorescent screen can be effected by a single locking slider. For executing the previously described positions of the locking device, i.e. the locking position, the intermediate position and the unlocking position, the locking slider must merely be displaced to different longitudinal positions.

A retaining pin projecting from the upper face of the storage fluorescent screen is used as the retaining element for the storage fluorescent screen. The use of such a retaining pin is advantageous because the locking slider can engage the retaining pin relatively simply with its second locking aperture, while a defined position of the storage fluorescent screen in the cassette is ensured at the same time.

The locking slider is preloaded to its locking position by an elastic element, so that the flap is in all cases locked when the locking slider is not actuated.

In order to retain the storage fluorescent screen in a defined position in the cassette with the flap closed it is further proposed to provide at least one locking element on the inner face of the flap oriented towards the interior of the cassette, which locking element is the engagement with a retaining aperture provided on the storage fluorescent screen to fix the latter when the lid is closed.

If the previously described locking slider is used to lock the flap it is further advantageous if the above-described locking element of the flap serves at the same time for engaging with the first locking aperture of the locking slider.

In an another embodiment of the cassette according to the invention the flap is made of a plastic material, for example, ABS, PA or PP, so that the flap has limited flexibility and permits, for example, flexing of the cassette under loads, as in an application in which a patient is supported on an uneven or yielding substrate and the cassette is pushed under the patient for taking an X-ray image. At the same time, the flexible plastic material can better absorb forces transmitted to the cassette by a fall or an impact. In addition, it is achieved by the use of the flexible material that the flap, when retained in its locked position with appropriate preloading force, bears uniformly against the edge of the opening, whereby an especially high degree of light sealing of the cassette is ensured.

If a flap made of plastic material is used it is further proposed to configure the locking element as an elevation impressed inwardly towards the inner face of the flap, while the recess thereby formed on the outer face of the flap can be used at the same time for opening the flap. In this embodiment, therefore, the locking element not only serves as a counterpart to the locking device, but also at the same time as an aid to opening, for example, for an operating element of a readout device which engages in the recess formed on the outside of the flap and in this way can open the flap.

The retaining aperture provided on the storage fluorescent screen can also serve as a coupling element for a gripper with which the storage fluorescent screen can be inserted in or removed from the cassette.

In another embodiment of the cassette according to the invention the cassette is configured in the form of a frame to which the cassette lid is fixed. In this embodiment of the cassette the base is pushed into the frame together with the flap and is detachably joined to the frame. This construction makes possible very rapid, trouble-free and simple dismantling of the cassette, for example, for cleaning or maintenance purposes.

BRIEF DESCRIPTION OF THE DRAWINGS

The invention and further advantages thereof are elucidated in detail below with reference to an embodiment and to the drawings, in which.

DETAILED DESCRIPTION OF THE INVENTION

Figure 1:
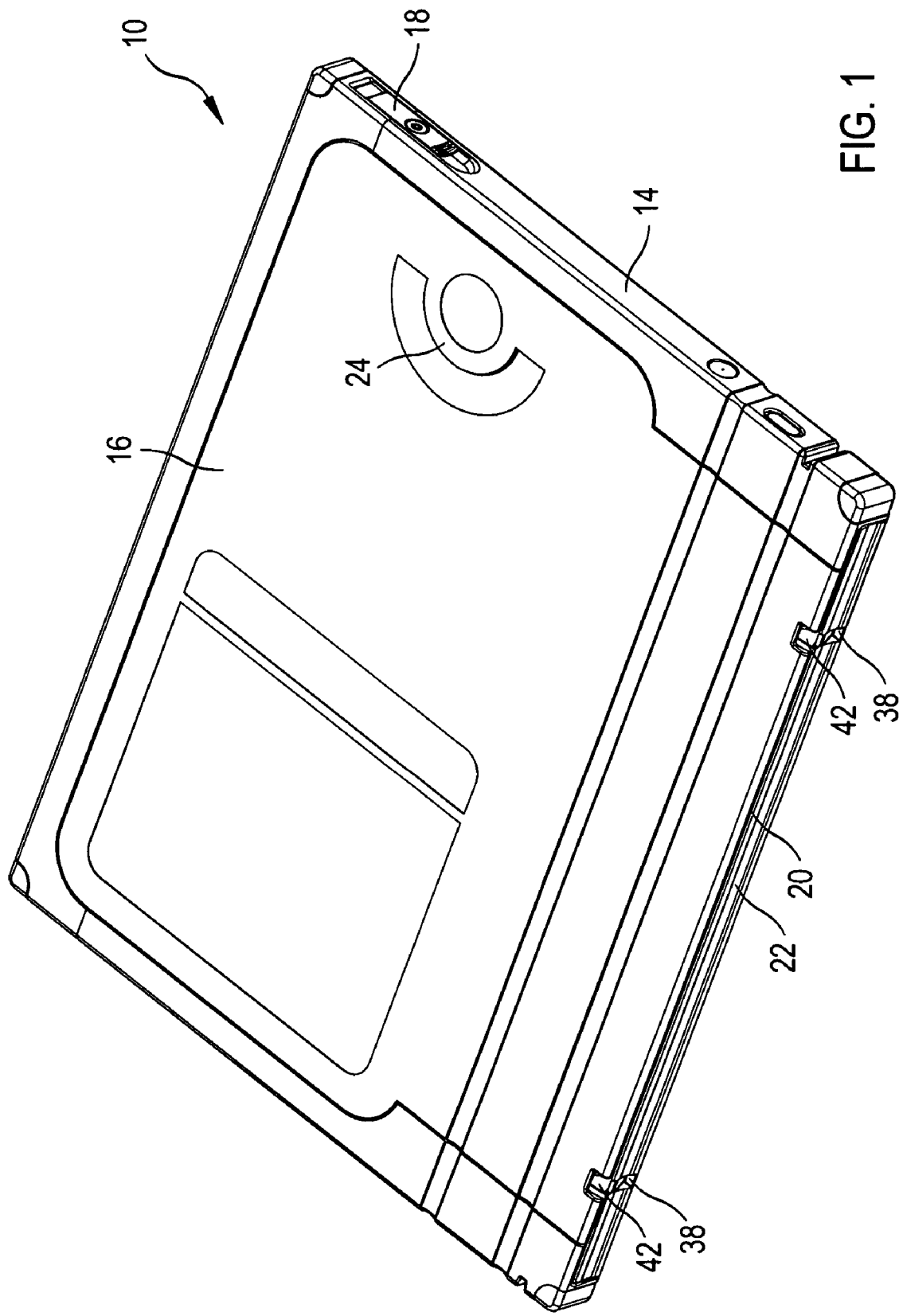
FIG. 1 is a perspective view of a cassette according to the invention for receiving a storage fluorescent screen.

FIG. 1 shows a perspective representation of a cassette 10 according to the invention for receiving a storage fluorescent screen. The cassette 10 is in the form of an open frame 14 to which a cassette lid 16 is fixed. The base of the cassette 10 is inserted in the frame 14 and locked thereto. For unlocking there is provided on each of the two side faces of the cassette 10 an unlocking slider 18 which releases the base when actuated, so that the latter can be pulled out of the frame 14.

On the narrow side of the cassette 10 illustrated at the front in FIG. 1 there is provided an opening 20 through which a storage fluorescent screen can be inserted into or removed from the cassette 10. The opening 20 is closable by a flap 22. The flap 22 is made of plastic material and is articulated swivellably by a film hinge (not shown) to the front edge of the base which borders the opening 20 on the lower side.

The flap 22 has an L-shaped cross-section, viewed in the direction transverse to the swivel axis of the flap 22, one flange of the L-shaped cross-section being mounted swivellably to the base by the film hinge. The other flange of the flap 22 is disposed at right angles to the first flange and, when the flap 22 is moved to the closed position, is inserted below the cassette lid 16, as shown in FIG. 1.

Also provided on the upper face of the cassette lid 16 is a clipping device 24 with which, for example, information material such as slips of paper or the like, can be clipped to the cassette 10.

Figure 2:
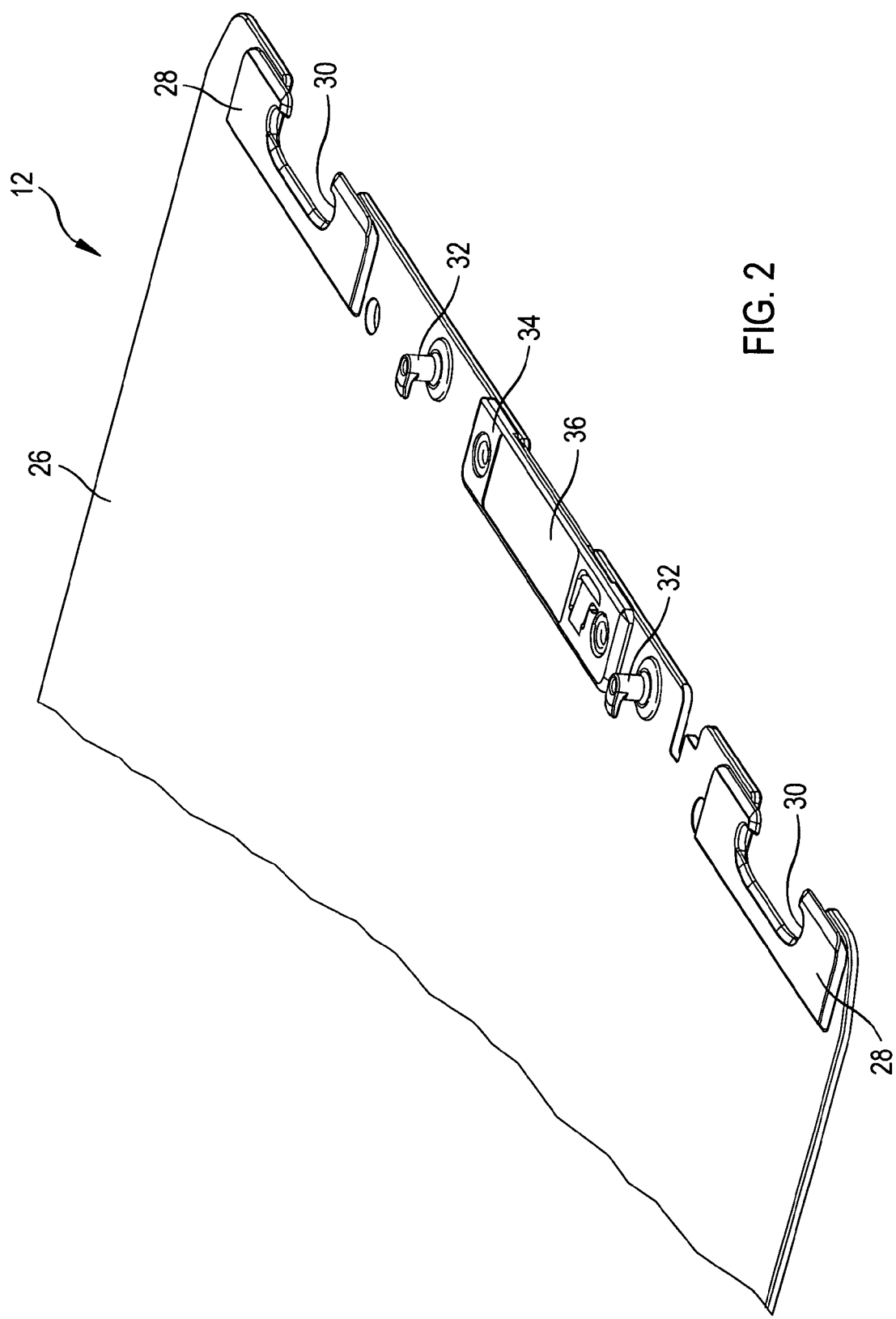
FIG. 2 is a perspective view of a portion of the storage fluorescent screen to be used with the cassette according to the invention.

FIG. 2 is a perspective view of a portion of the storage fluorescent screen 12 on the front edge of which various functional elements, which are explained below, are provided. The storage fluorescent screen 12 is formed by a substrate 26 on the upper face of which a phosphor layer (not shown) serving for latent storage of an image is applied in a known fashion. On the front edge of the substrate 26 a metal anchoring plate 28 is provided directly adjacent to each lateral edge. The anchoring plate 28 has an elongated retaining aperture 30 extending in the longitudinal direction of the front edge and open on its front side.

Fixed between the two anchoring plates 28 are two upwardly projecting retaining pins 32 which in each case are spaced approximately equally from the immediately adjacent anchoring plate 28. Provided between the two retaining pins 32 is a chipcard holder 34, by which a chipcard 36 for storage of information, for example, information on a patient, is retained.

Figure 3:
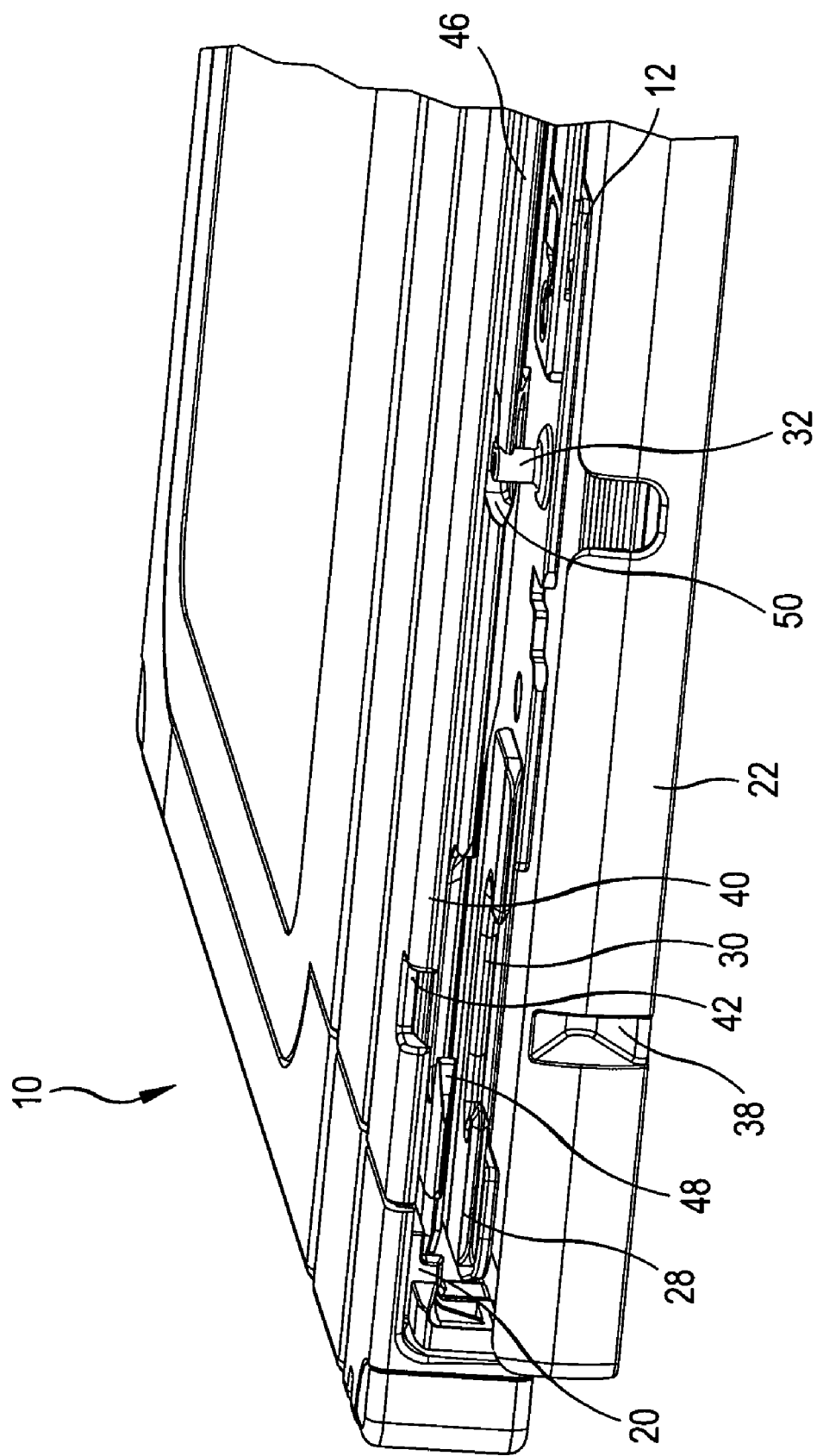
FIG. 3 is a perspective view of a portion of the cassette according to the invention with the flap open.

FIG. 3 is a perspective view of a portion of the narrow side of the cassette 10 in which the opening 20 is formed, the flap 22 articulated swivellably to the base being open. As is also apparent from the illustration, the storage fluorescent screen 12 is inserted in the cassette 10, one of the anchoring plates 28 and one of the retaining pins 32 being illustrated.

As can also be seen from FIG. 3, a pyramid-shaped elevation 38 which projects from the inner face of the flap 22 towards the interior of the cassette 10 is provided on the flap 22. When the flap 22 is closed the section of the elevation 38 is located below a recess 42 (see FIG. 1) provided in the upper edge 40 of the opening 20.

As is also shown in FIG. 3, a locking device is provided in the cassette 10. This locking device is formed by a locking slider 46 which is mounted in a longitudinally displaceable manner in the cassette 10 parallel to the opening 20.

The construction and operation of this locking slider 46 of the locking device are explained in more detail below with reference to FIGS. 4 and 5a.

Figure 4:
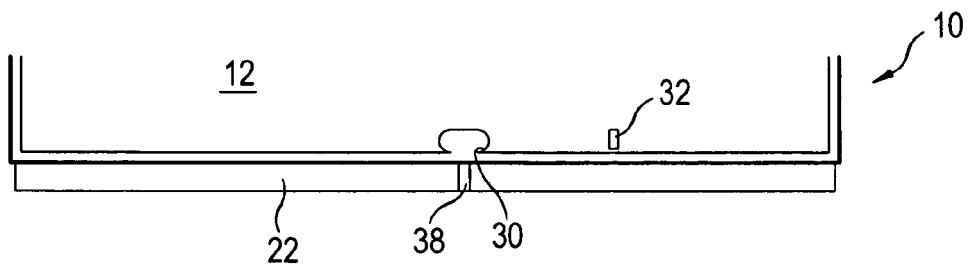
FIG. 4 is a schematic representation of a section of the cassette according to the invention with inserted storage fluorescent screen, a locking device provided in the cassette not being shown for reasons of clarity.

FIG. 4 is a schematic representation of a section of the cassette 10 according to the invention, the cassette lid 16 and the locking slider 46 (see FIGS. 1 and 3) being omitted for greater clarity. Inserted in the cassette 10 is a storage fluorescent screen 12 which in this simplified representation is provided with only a single anchoring plate 28 with retaining aperture 30, and a single retaining pin 32. Self-evidently, the storage fluorescent screen 12 may also be equipped with two or more anchoring plates 28 and retaining pins 32, as shown in FIG. 2. Illustrated at the narrow edge of the cassette 10 shown at the bottom in FIG. 4 is the flap 22, which is currently open. The elevation 38 provided on the flap 22 is so arranged on the flap 22 that the retaining aperture 30 of the anchoring plate 28 of the storage fluorescent plate 12 is aligned with the elevation 38 when the storage fluorescent plate 12 is inserted in the cassette 10.

In FIGS. 5a to 5e the cassette 10 is illustrated schematically in a manner analogous to FIG. 4, the locking slider 46 being additionally included to clarify the locking mechanism.

Figure 5A:
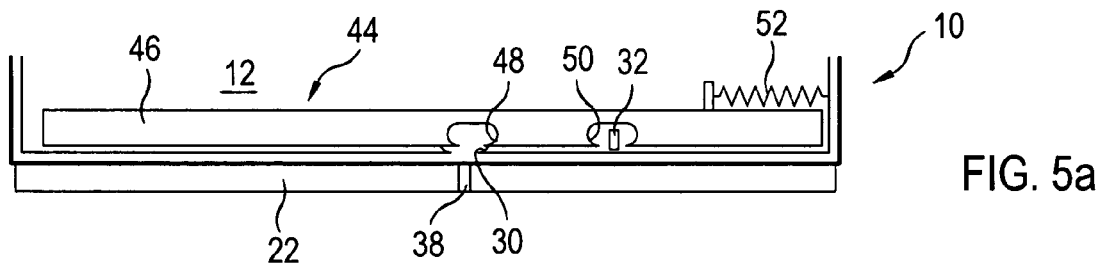
FIGS. 5a to 5e are schematic representations of the cassette according to the invention with inserted storage fluorescent screen and a locking device which is shown in different operating positions.

As shown in FIG. 5a, the locking slider 46 has two locking apertures 48 and 50. The first locking aperture 48 is arranged approximately level with the elevation 38 of the flap 22 and serves to engage with the elevation 38, as is explained in detail later. Provided adjacent to the first locking aperture 48 is a second locking aperture 50 which serves to engage with the locking pin 32.

Figure 5B:
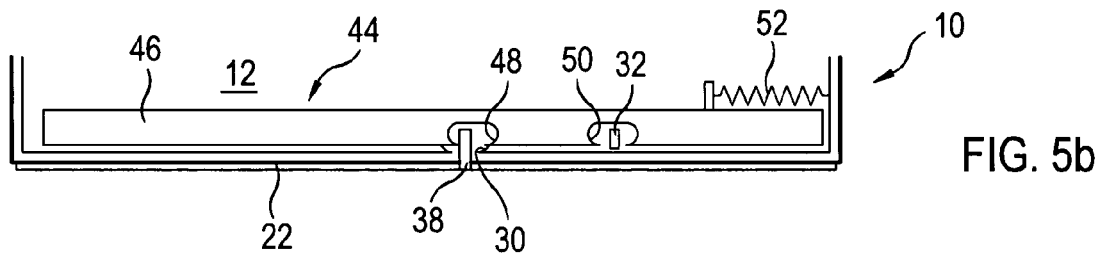

The locking slider 46 is preloaded by a tension spring 52 towards a locking position, as shown in FIG. 5b. In this locking position the first locking aperture 48 is in engagement with the elevation 38 of the flap 22 which has moved to its closed position, whereby the flap 22 is locked. At the same time the second locking aperture 50 is so arranged relative to the retaining pin 32 of the storage fluorescent screen 12 that it is not in engagement with the retaining pin 32. However, in this locking position shown in FIG. 5b the elevation 38 projects into the retaining aperture 30 of the anchoring plate 28 of the storage fluorescent screen 12, whereby the latter is retained in a defined position in the cassette 10 at least to a limited extent. At the same time the elevation 38 is additionally supported by the recess 42 on the cassette lid 16 (see FIG. 1).

Figure 5C:
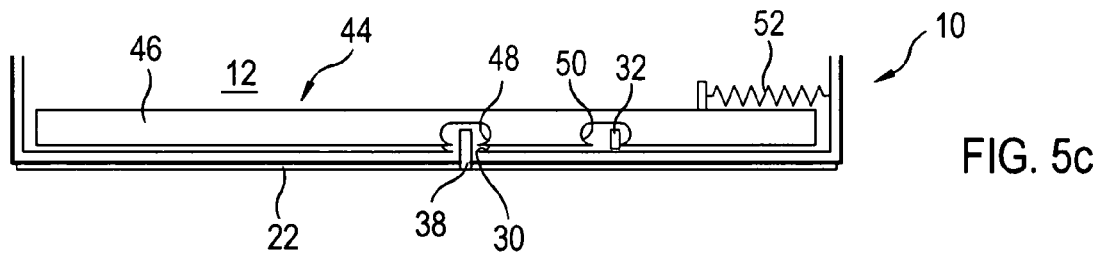

As can be seen in FIG. 5c, the locking slider 46 can now be moved from outside against the force of the tension spring 52 to an intermediate position in which the first locking aperture 48 releases the elevation 38 while at the same time the second locking aperture 50 moves into engagement with the retaining pin 32 of the storage fluorescent screen 12. In this position the storage fluorescent screen 12 is retained in a defined position in the cassette 10, while at the same time the flap 22 is released for opening.

Figure 5D:
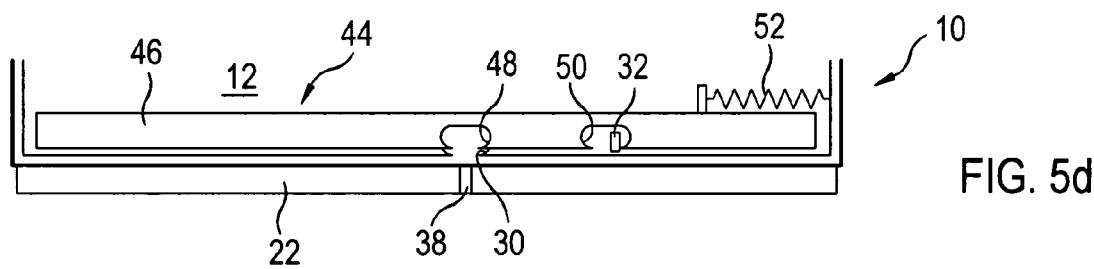

Opening can now be effected either manually or in an automated manner by a suitable actuating element. If such an actuating element is used it is advantageous if the actuating element engages from outside in the elevation 38 and swivels the flap 22 away downwardly. This operating state is shown in FIG. 5d.

Figure 5E:
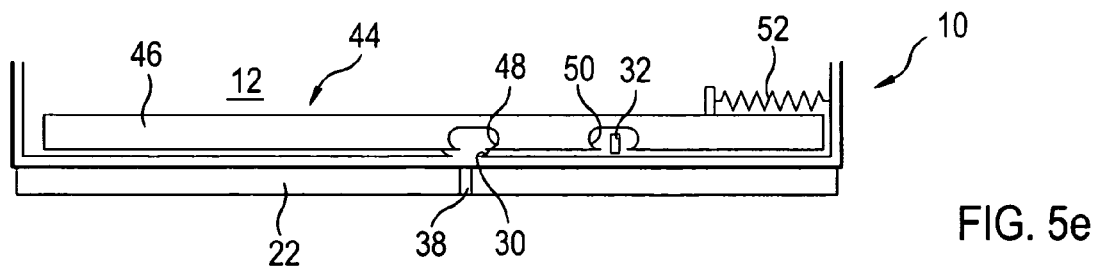

In a last step, shown in FIG. 5e, the locking slider 46 is again released so that the tension spring 52 pulls the locking slider 46 back to its starting position. In this starting position the storage fluorescent screen 12 can be removed from the cassette 10.

After insertion of the storage fluorescent screen 12, the cassette 10 is closed again in the reverse sequence. For this purpose, after insertion of the storage fluorescent plate 12, the locking slider 46 is first moved back to its intermediate position in which its second locking aperture moves into engagement with the retaining pin 32, while the first locking aperture 48 and the retaining aperture 30 of the anchoring plate 28 are aligned with one another. Then the flap 22 is closed, the elevation 38 being inserted in the first locking aperture 48 and the retaining aperture 30, as shown in FIG. 5c. Then the locking slider 46 is released, so that the tension spring 52 moves the locking slider 46 back to its starting position in which its first locking aperture 48 engages with the elevation 38 of the flap 22 and locks the latter, while at the same time the second locking aperture 50 releases the retaining pin 32 again.

Alternatively or additionally, the elevation 38 and/or the first locking aperture 48 may be so formed that, when the flap 22 is closed, the locking slider 46 can initially remain in its starting position and be moved briefly to its intermediate position solely by the force with which the elevation 38 presses on the first locking aperture 48 when the flap 22 is closed. In this intermediate position the first locking aperture 48 snaps into the elevation 38, the locking slider 46 being moved back to its starting position.

When removing the storage fluorescent screen 12 there is also the possibility of maintaining the locking slider 46 in engagement with the retaining pin 32 (see, e.g. FIG. 5d) until a corresponding handling device engages with the retaining aperture 30. The retaining aperture 30 then serves as a coupling element for the handling device.

The locking slider 46 can then be moved back to its starting position (see, e.g. FIG. 5e), so that the storage fluorescent screen 12 is released and the handling device can remove the storage fluorescent screen 12 from the cassette 10.

LIST OF REFERENCE NUMERALS

10 Cassette
12 Storage fluorescent screen
14 Frame
16 Cassette lid
18 Unlocking slider
20 Opening
22 Flap
24 Clipping device
26 Substrate
28 Anchoring plate
30 Retaining aperture
32 Retaining pin
34 Chipcard holder
36 Chipcard
38 Elevation
40 Upper edge
42 Recess
44 Locking device
46 Locking slider
48 First locking aperture
50 Second locking aperture
52 Tension spring

The invention claimed is:

1. A cassette for receiving a storage fluorescent screen, comprising:
 an opening formed in a narrow side of the cassette, through which opening the storage fluorescent screen is inserted or removed from the cassette, and
 a closure which is displaceable between a closed position in which the closure closes the opening and a release position in which the closure releases the opening for insertion or removal of the storage fluorescent screen, wherein the closure comprises a flap, and wherein the flap is mounted swivellably to a transition between the narrow side of the cassette provided with the opening and a base of the cassette or a cassette lid; and
 a locking device which can be actuated from outside on the cassette, and wherein the locking device locks the flap in its closed position and releases the flap for opening when actuated from outside, wherein the locking device serves to fix the storage fluorescent screen in the cassette when the flap has been moved to the release position.

2. A cassette as claimed in claim 1, wherein the flap has an L-shaped cross-section, viewed in a direction transverse to a swivel axis of the flap.

3. A cassette as claimed in claim 2, wherein one flange of the L-shaped flap is mounted swivellably to the base of the cassette while another flange of the L-shaped flap is inserted below the cassette lid into an interior of the cassette in the closed position of the flap.

4. A cassette as claimed in claim 1, wherein the flap is mounted swivellably by a hinge to the base of the cassette.

5. A cassette as claimed in claim 1, wherein the flap is mounted swivellably to the cassette by means of a film hinge.

6. A cassette as claimed in claim 1, wherein the cassette is in the form of a frame to which the cassette lid is fixed, and wherein the base of the cassette together with the flap is pushed into the frame and joined detachably thereto.

7. A cassette for receiving a storage fluorescent screen, comprising:
 an opening formed in a narrow side of the cassette, through which opening the storage fluorescent screen is inserted or removed from the cassette, and
 a closure which is displaceable between a closed position in which the closure closes the opening and a release position in which the closure releases the opening for insertion or removal of the storage fluorescent screen, wherein the closure comprises a flap, and wherein the flap is mounted swivellably to a transition between the narrow side of the cassette provided with the opening and a base of the cassette or a cassette lid;
 a locking device which can be actuated from outside on the cassette, and wherein the locking device locks the flap in its closed position and releases the flap for opening when actuated from outside, the locking device comprising a locking slider mounted displaceably parallel to a longitudinal direction of the opening, which locking slider has at least one first locking aperture for engaging with a locking element provided on an inner face of the flap facing towards an interior of the cassette, and at least one second locking aperture for engaging with a retaining element projecting from the storage fluorescent screen.

8. A cassette as claimed in claim 7, wherein the locking device also serves to fix the storage fluorescent screen in the cassette when the flap has been moved to the release position.

9. A cassette as claimed in claim 8, wherein the locking device is movable between a locking position in which it locks the flap in its closed position, an intermediate position in which it has released the flap for opening and is in engagement with at least one retaining element provided on the storage fluorescent screen for fixing the storage fluorescent screen, and an unlocking position in which it releases the storage fluorescent screen.

10. A cassette as claimed in claim 7, wherein the retaining element is a retaining pin projecting from an upper face of the storage fluorescent screen.

11. A cassette as claimed in claim 7, wherein the locking slider is preloaded to its locking position by an elastic element.

12. A cassette as claimed in claim 7, wherein the locking element also serves to engage with the first locking aperture of the locking slider.

13. A cassette for receiving a storage fluorescent screen, comprising:
 an opening formed in a narrow side of the cassette, through which opening the storage fluorescent screen is inserted or removed from the cassette, and
 a closure which is displaceable between a closed position in which the closure closes the opening and a release position in which the closure releases the opening for insertion or removal of the storage fluorescent screen, wherein the closure comprises a flap, and wherein the flap is mounted swivellably to a transition between the narrow side of the cassette provided with the opening and a base of the cassette or a cassette lid; and
 at least one locking element provided on an inner face of the flap oriented towards an interior of the cassette which engages with a retaining aperture provided on the storage fluorescent screen to fix the storage fluorescent screen when the flap is closed.

14. A cassette as claimed in claim 13, wherein the flap is made of a plastic material and wherein the locking element is formed by an elevation impressed inwardly towards the inner face of the flap, a recess formed thereby on an outer face of the flap being usable to open the flap.

15. A cassette as claimed in claim 13, wherein the retaining aperture on the storage fluorescent screen also serves as a coupling element for a gripper with which the storage fluorescent screen can be inserted in or removed from the cassette.

16. A cassette as claimed in claim 13, wherein the flap has an L-shaped cross-section, viewed in a direction transverse to a swivel axis of the flap.

17. A cassette as claimed in claim 16, wherein one flange of the L-shaped flap is mounted swivellably to the base of the cassette while another flange of the L-shaped flap is inserted below the cassette lid into an interior of the cassette in the closed position of the flap.

18. A cassette as claimed in claim 13, wherein the flap is mounted swivellably by a hinge to the base of the cassette.

19. A cassette as claimed in claim 13, wherein the flap is mounted swivellably to the cassette by means of a film hinge.

20. A cassette as claimed in claim 13, wherein the cassette is in the form of a frame to which the cassette lid is fixed, and wherein the base of the cassette together with the flap is pushed into the frame and joined detachably thereto.

* * * * *